US009263884B2

(12) United States Patent
Kato

(10) Patent No.: US 9,263,884 B2
(45) Date of Patent: Feb. 16, 2016

(54) ELECTROSTATIC PROTECTION CIRCUIT

(71) Applicant: KABUSHIKI KAISHA TOSHIBA, Tokyo (JP)

(72) Inventor: Kazuhiro Kato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 14/194,571

(22) Filed: Feb. 28, 2014

(65) Prior Publication Data
US 2014/0368957 A1  Dec. 18, 2014

(30) Foreign Application Priority Data

Jun. 12, 2013  (JP) .................................. 2013-123672

(51) Int. Cl.
*H02H 9/04* (2006.01)

(52) U.S. Cl.
CPC ............... *H02H 9/046* (2013.01); *H02H 9/041* (2013.01)

(58) Field of Classification Search
CPC .................................. H02H 9/04; H02H 9/046
USPC ........................................................... 361/56
See application file for complete search history.

(56) References Cited

U.S. PATENT DOCUMENTS

| 5,781,388 A | 7/1998 | Quigley |
| 8,189,310 B2 | 5/2012 | Yamadaya |
| 2007/0188953 A1* | 8/2007 | Lee et al. ........................ 361/56 |
| 2011/0051301 A1 | 3/2011 | Thijs et al. |

FOREIGN PATENT DOCUMENTS

| JP | 10-134988 | 3/1998 |
| JP | 2010-067894 A | 3/2010 |
| JP | 2011-071502 A | 4/2011 |
| JP | 2011-100907 A | 5/2011 |

* cited by examiner

*Primary Examiner* — Dharti Patel
(74) *Attorney, Agent, or Firm* — Patterson & Sheridan, LLP

(57) ABSTRACT

An electrostatic protection circuit includes a trigger circuit connected between a first and second power source line. The trigger circuit outputs a trigger signal in response to a voltage difference between the power source lines, such as occurs when an electrostatic discharge is received along the power source lines. A buffer circuit in the protection circuit outputs a drive signal in response to the trigger signal. A switch circuit is connected between the first and second power source lines and controls the ON/OFF conduction state between the power source lines in response to the drive signal. A control circuit supplies a control signal to the switch circuit after the drive signal causes the switch circuit to switch to the ON conduction state. The control signal maintains the switch in the ON conduction state while the voltage difference between power source lines exceeds a predetermined value.

16 Claims, 5 Drawing Sheets

ELECTROSTATIC PROTECTION CIRCUIT

CROSS-REFERENCE TO RELATED APPLICATION

This application is based upon and claims the benefit of priority from Japanese Patent Application No. 2013-123672, filed Jun. 12, 2013, the entire contents of which are incorporated herein by reference.

FIELD

Embodiments described herein relate to an electrostatic protection circuit.

BACKGROUND

Conventionally, various circuits for protecting against an Electrostatic Discharge (ESD) have been proposed. As used herein, ESD means a discharge of electricity from a person or a machine charged with electricity to a semiconductor device or a discharge of electricity from a semiconductor device charged with electricity to a ground potential or the like.

When an ESD is received by a semiconductor device, an electric charge flows into the semiconductor device from terminals of the semiconductor device, and this electric charge generates a high voltage in the semiconductor device which may cause an insulation breakdown in an internal element of the semiconductor device and/or failure of the semiconductor device.

A typical example of an electrostatic protection circuit is an RCT (RC Triggered) MOS circuit. The RCT electrostatic protection circuit includes a trigger circuit, which includes a resistor and a capacitor connected in series between power source terminals, and a MOS transistor is driven using a voltage from a connection point (node) between the resistor and the capacitor as a trigger signal. The MOS transistor is switched to an ON state for discharging the electrostatic charge according to a time constant of the trigger circuit. That is, once the voltage at the connection node exceeds a threshold voltage of the MOS transistor, the MOS transistor is switched to a conductive state. The trigger signal maintains the MOS transistor in a conductive state while the capacitor remains charged above the threshold level of the MOS transistor. Hence, it is necessary to set the time constant of the trigger circuit such that an ESD surge can be sufficiently discharged. However, when the time constant becomes large, the trigger circuit will responds to fluctuations in the power supply voltage during normal operation of the internal circuit and hence, there is a possibility that the protective MOS transistor is erroneously operated when an ESD surge is not generated. When the MOS transistor is erroneously operated the power source voltage does not sufficiently rise to an intended value thus causing an operation failure in the internal circuit. Further, when the time constant is set such that that the protective MOS transistor is held in an ON state for a long time, there exists a possibility that the MOS transistor will break down.

DETAILED DESCRIPTION

According to an embodiment, there is provided an electrostatic protection circuit which can sufficiently discharge an ESD surge while preventing erroneous operation.

In general, according to one embodiment, an electrostatic protection circuit includes: a trigger circuit connected between first and second power source lines. The trigger circuit is configured to output a trigger signal in response to a voltage difference between the power source lines, such as when an electrostatic discharge (ESD) is received along the first power source line. A buffer circuit in the protection circuit outputs a drive signal in response to the trigger signal. The drive signal is supplied to a switch circuit. The switch circuit is connected between the first and second power source lines and controls the ON/OFF conduction state between the power source lines in response to the drive signal. That is, the switch circuit electrically connects or disconnects the first and second power source lines to/from each other according to the level of the drive signal. The drive signal from the buffer circuit is also supplied to a control circuit. The control circuit is configured to supply a control signal to the switch circuit when the drive signal causes the switch circuit to switch to the ON conduction state. The control signal is set to maintain the switch in the ON conduction state while the voltage difference between power source lines exceeds a predetermined value, such as the triggering value which causes the switch circuit to be placed in the ON state. Thus, the control signal can maintain the switch circuit in the ON state even if the trigger signal drops below an initial triggering value.

Hereinafter, electrostatic protection circuits according to example embodiments are explained in detail in conjunction with drawings. These exemplary embodiments are for purposes of explanation and are not intended to be limiting of the scope of the present disclosure.

(First Embodiment)

Figure 1:
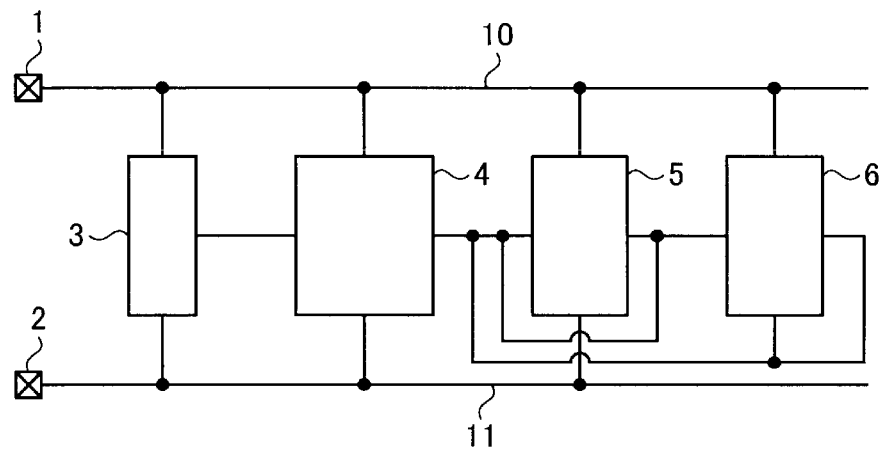
FIG. 1 is a diagram of an electrostatic protection circuit according to a first embodiment.

FIG. 1 is a circuit diagram of an electrostatic protection circuit according to the first embodiment. An electrostatic protection circuit of this first embodiment includes: a first power source line 10 at a high potential side which is connected to a first power source terminal 1, and a second power source line 11 at a low potential side which is connected to a second power source terminal 2.

A predetermined power source voltage VCC is applied to the first power source terminal 1, for example. A ground potential is applied to the second power source terminal 2, for example.

A trigger circuit 3, a buffer circuit 4, a switch circuit 5 and a control circuit 6 are connected between the first power source line 10 and the second power source line 11.

The trigger circuit 3 outputs a trigger signal in response to a voltage difference between the first power source line 10 and the second power source line 11.

The buffer circuit 4 outputs a drive signal in response to the trigger signal from the trigger circuit 3.

The switch circuit 5 has a main current path connected between the first power source line 10 and the second power source line 11, and controls the conduction state (ON/OFF) of the main current path in response to a drive signal supplied to a control electrode of the switch circuit 5 from the buffer circuit 4.

The drive signal from the buffer circuit 4 is also supplied to the control circuit 6. An output of the control circuit 6 is supplied to the switch circuit 5.

In the electrostatic protection circuit of this embodiment, the control circuit 6 provides a signal which keeps the switch circuit 5 in an ON state. Accordingly, it is possible to extend an ON time of the switch circuit 5 by operation of the control circuit 6. By extending the ON time of the switch circuit 5, an ESD surge can be sufficiently discharged.

The control circuit 6 is operated in response to the drive signal from the buffer circuit 4, and forms a so-called positive feedback loop where the control circuit 6 feeds back a signal of a high level to a control electrode of the switch circuit 5 when the drive signal from the buffer circuit 4 for turning on the switch circuit 5 is a signal of a high level, and feeds back a signal of a low level to the control electrode of the switch circuit 5 when the drive signal from the buffer circuit 4 for turning on the switch circuit 5 is a signal of a low level.

Accordingly, after the positive feedback loop is formed, the control circuit 6 can supply a signal which can maintain an ON state of the switch circuit 5 to the control electrode of the switch circuit 5 without depending on the drive signal from the buffer circuit 4. Thus, a time constant of the trigger circuit 3 can be shortened, and an ESD surge can still be sufficiently discharged. By shortening the time constant of the trigger circuit 3, it is possible to limit erroneous operations at startup or due the fluctuation of a power source voltage during normal operations.

(Second Embodiment)

Figure 2:
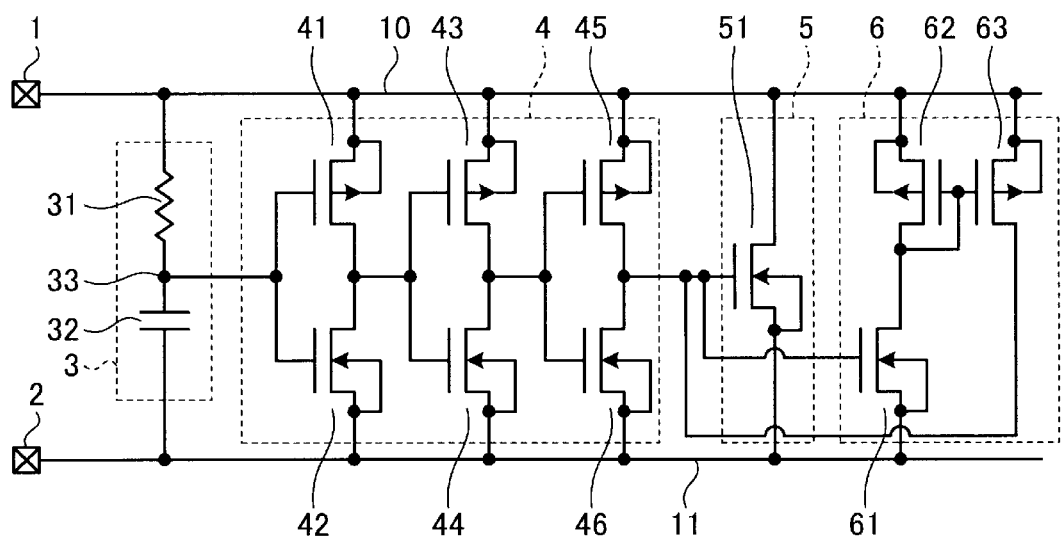
FIG. 2 is a diagram of an electrostatic protection circuit according to a second embodiment.

FIG. 2 is a circuit diagram of an electrostatic protection circuit according to the second embodiment. Elements of the second embodiment which correspond to the elements of the first embodiment are given same reference symbols, and the repeated explanation of these elements may be omitted.

The electrostatic protection circuit of this embodiment includes a trigger circuit 3 which is connected between a first power source line 10 and a second power source line 11. The trigger circuit 3 includes a resistor 31 and a capacitor 32 connected in series. A common connection node 33 of the resistor 31 and the capacitor 32 constitutes an output end of the trigger circuit 3.

A buffer circuit 4 includes a three-stage CMOS inverter. That is, a PMOS transistor 41 and an NMOS transistor 42 constitute a first CMOS inverter. A source electrode and a back gate electrode of the PMOS transistor 41 are connected to the first power source line 10. A source electrode and a back gate electrode of the NMOS transistor 42 are connected to the second power source line 11. A gate electrode of the PMOS transistor 41 and a gate electrode of the NMOS transistor 42 are connected to the common connection node 33 of the trigger circuit 3. A drain electrode of the PMOS transistor 41 and a drain electrode of the NMOS transistor 42 are connected in common and constitute an output end of the first CMOS inverter.

In a similar manner, a PMOS transistor 43 and an NMOS transistor 44 constitute a second CMOS inverter, and a PMOS transistor 45 and an NMOS transistor 46 constitute a third CMOS inverter.

A drain electrode of the PMOS transistor 45 and a drain electrode of the NMOS transistor 46 which are connected in common constitute an output end of the buffer circuit 4. A drive signal is output from the drain electrode of the PMOS transistor 45 and the drain electrode of the NMOS transistor 46.

A gate electrode of an NMOS transistor (hereinafter referred to as "NMOS shunt transistor") 51 which comprises the switch circuit 5 is connected to the output end of the buffer circuit 4. A drain electrode of the NMOS shunt transistor 51 is connected to the first power source line 10, and a source electrode and a back gate electrode of the NMOS shunt transistor 51 are connected to the second power source line 11. That is, a source-drain path, which is a main current path, of the NMOS shunt transistor 51 is connected between the first power source line 10 and the second power source line 11.

By forming the buffer circuit 4 using CMOS inverters in multiple stages, an NMOS transistor having a large current capacity can be used as the NMOS shunt transistor 51. By increasing a current capacity of the NMOS shunt transistor 51, the ability to discharge an ESD surge can be enhanced.

A control circuit 6 includes an NMOS transistor 61 which has a gate electrode connected in common with the gate electrode of the NMOS shunt transistor 51. A source electrode and a back gate electrode of the NMOS transistor 61 are connected to the second power source line 11. A drain electrode of the NMOS transistor 61 is connected to a drain electrode of a PMOS transistor 62. The PMOS transistor 62 and a PMOS transistor 63 form a current mirror circuit. A source electrode and a back gate electrode of the PMOS transistor 62 are connected to the first power source line 10. A source electrode and a back gate electrode of the PMOS transistor 63 are connected to the first power source line 10. A gate electrode of the PMOS transistor 63 is connected to a gate electrode of the PMOS transistor 62 and to the drain electrode of the NMOS transistor 61. A drain electrode of the PMOS transistor 63 is connected to the gate electrode of the NMOS transistor 51. That is, the drain electrode of the PMOS transistor 63, which constitutes an output end of the control circuit 6, is connected to the gate electrode of the NMOS transistor 51.

When an ESD surge, which is positive in potential with respect to the second power source terminal 2, is applied to a first power source terminal 1, a transient electric current flows in the trigger circuit 3.

When a voltage drop across the resistor 31 of the trigger circuit 3 exceeds a threshold value of the PMOS transistor 41, the PMOS transistor 41 is turned on.

When the PMOS transistor 41 is turned on, a signal of a high level is supplied to the gate electrodes of the PMOS transistor 43 and the NMOS transistor 44, which constitute the CMOS inverter in the second stage.

When the signal of a high level is supplied, the NMOS transistor 44 is turned on.

When the NMOS transistor 44 is turned on, a signal of a low level is supplied to the gate electrodes of the PMOS transistor 45 and the NMOS transistor 46, which constitute the third CMOS inverter.

When the signal of a low level is supplied, the PMOS transistor 45 is turned on, and a signal of a high level is supplied to the gate electrode of the NMOS shunt transistor 51.

When the signal of a high level is supplied to the gate electrode of the NMOS shunt transistor 51, the NMOS shunt transistor 51 is turned on and an ESD surge can be discharged.

The signal of a high level that is applied to the gate electrode of the NMOS shunt transistor 51 is also applied to the gate electrode of the NMOS transistor 61 of the control circuit 6. Accordingly, the NMOS transistor 61 is turned on.

When the NMOS transistor 61 is turned on, a signal of a low level is supplied to the gate electrodes of the PMOS transistor 62 and the PMOS transistor 63, which form the current mirror circuit. Accordingly, the PMOS transistor 62 and the PMOS transistor 63 are turned on.

When the PMOS transistor 63 is turned on, a potential of the first power source line 10 (that is, a signal of a high level) is applied to the gate electrode of the NMOS shunt transistor 51 via the PMOS transistor 63. Thus, not only a drive signal from the buffer circuit 4 but also an ON signal (control signal) from the control circuit 6 are supplied to the gate electrode of the NMOS shunt transistor 51.

In the electrostatic protection circuit of this embodiment, the control circuit 6 supplies a signal of a high level to the gate electrode of the NMOS shunt transistor 51 in response to the drive signal from the buffer circuit 4. Such a signal is supplied so as to maintain an ON state of the NMOS shunt transistor 51. A positive feedback loop is formed in the control circuit 6. That is, the positive feedback loop is formed where when a signal of a high level is applied to the gate electrode of the NMOS shunt transistor 51 and the NMOS transistor 61, the PMOS transistor 62 and the PMOS transistor 63, which constitute the current mirror circuit, are turned on so that a potential of the first power source line 10, that is, a signal of a high level is supplied to the gate electrode of the NMOS transistor 61 and NMOS shunt transistor 51.

Thus, a positive feedback loop is formed in response to the drive signal from the buffer circuit 4. Once the positive feedback loop is formed, it is maintained during while the NMOS transistor 61 is in an ON state, that is, during a period where a potential supplied from the drain electrode of the PMOS transistor 63 can maintain the NMOS transistor 61 in an ON state. When the potential of the first power source line 10 is high due to a surge current, the PMOS transistor 63 can maintain an ON state. That is, regardless of the drive signal from the buffer circuit 4, a signal of a high level from the control circuit 6 is supplied to the gate electrode of the NMOS shunt transistor 51. Thus, the supply of a high level signal to the gate electrode of the NMOS shunt transistor 51 from the control circuit 6 is continued until an ESD surge is discharged by the NMOS shunt transistor 51 such that a voltage of the first power source line 10 is lowered and a potential supplied from the drain electrode of the PMOS transistor 63 is consequently lowered to a threshold value (or less) of the NMOS transistor 61 whereby the NMOS transistor 61 is turned off.

Accordingly, even when a time constant of the trigger circuit 3 is shortened, it is possible to maintain the NMOS shunt transistor 51 in an ON state until an ESD surge is sufficiently discharged. By shortening the time constant of the trigger circuit 3, it is possible to provide the electrostatic protection circuit where an erroneous operation rarely occurs at startup or due to fluctuations of a power source voltage during normal operations.

(Third Embodiment)

Figure 3:
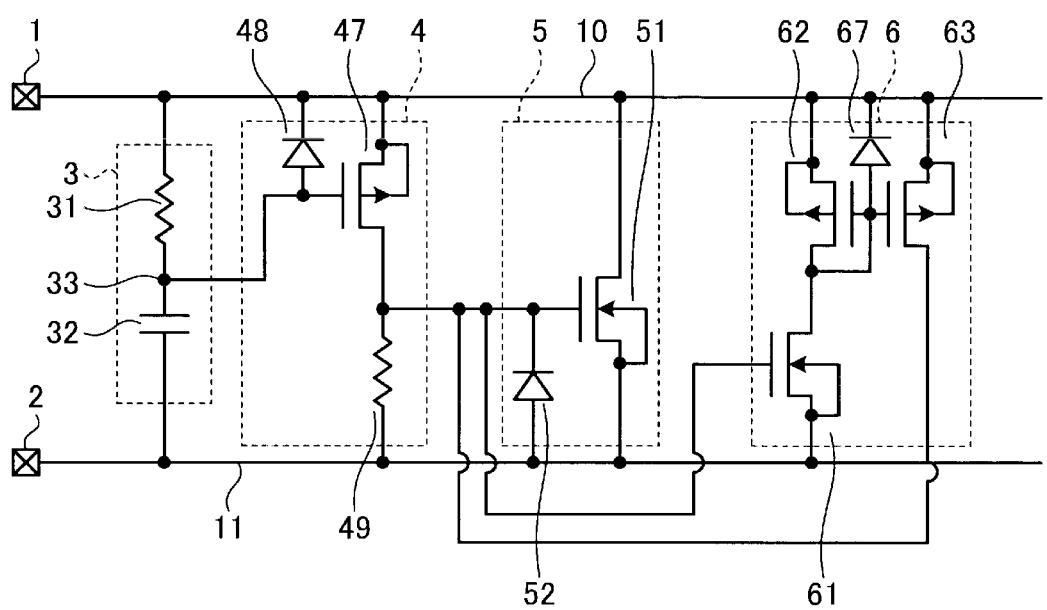
FIG. 3 is a diagram of an electrostatic protection circuit according to a third embodiment.

FIG. 3 is a circuit diagram showing an electrostatic protection circuit according to the third embodiment. Elements of the third embodiment which correspond to the elements of the previously explained embodiments are given same reference symbols, and the repeated explanation of these elements may be omitted.

A buffer circuit 4 of the electrostatic protection circuit of this third embodiment includes a PMOS transistor 47, a gate protection diode 48 and a resistor 49.

The PMOS transistor 47 has a gate electrode thereof connected to a common connection node 33 of the trigger circuit 3, and has a source electrode and a back gate electrode thereof connected to a first power source line 10. A drain electrode of the PMOS transistor 47 is connected to one end of the resistor 49, and the other end of the resistor 49 is connected to a second power source line 11.

The gate protection diode 48 is connected between the gate electrode and the source electrode of the PMOS transistor 47.

In this third embodiment, a gate electrode of an NMOS shunt transistor 51 is connected to the drain electrode of the PMOS transistor 47 of the buffer circuit 4. A gate protection diode 52 is connected between the gate electrode and a source electrode of the NMOS shunt transistor 51. A gate protection diode 67 is connected between gate electrodes of a PMOS transistor 62 and a PMOS transistor 63, which constitute a current mirror circuit of a control circuit 6, and the first power source line 10.

When an ESD surge, which is positive in potential with respect to a second power source terminal 2, is applied to a first power source terminal 1, a transient electric current flows in the trigger circuit 3. When a voltage drop across resistor 31 exceeds a threshold value of the PMOS transistor 47, the PMOS transistor 47 is turned on. When the PMOS transistor 47 is turned on, a signal of a high level is supplied to the NMOS shunt transistor 51 so that the NMOS shunt transistor 51 is turned on. When the NMOS shunt transistor 51 is turned on, the ESD surge is discharged.

In this third embodiment, the NMOS shunt transistor 51 is turned on in response to a signal of a high level and hence, the control circuit 6 is configured to supply a signal of a high level to the gate electrode of the NMOS shunt transistor 51 in response to a drive signal from the buffer circuit 4. Due to a positive feedback loop formed by an NMOS transistor 61, the PMOS transistor 62, and the PMOS transistor 63, even when the drive signal from the buffer circuit 4 reduces to a low level, a signal of a high level may still be supplied to the gate electrode of the NMOS shunt transistor 51.

In this third embodiment, a gate protection diode is included in buffer circuit 4, switch circuit 5, and control circuit 6. Accordingly, even when a power source voltage applied between the first power source terminal 1 and the second power source terminal 2 becomes high, the voltage between the gate and the source of the PMOS transistor 47, the voltage on the NMOS shunt transistor 51, and the voltage between the gates and the sources of the PMOS transistor 62 and the PMOS transistor 63 are limited by the gate protection diode 48, the gate protection diode 52, and the gate protection diode 67, respectively. Hence, breakdown of gate oxide films of the respective transistors can be prevented.

Figure 4A:
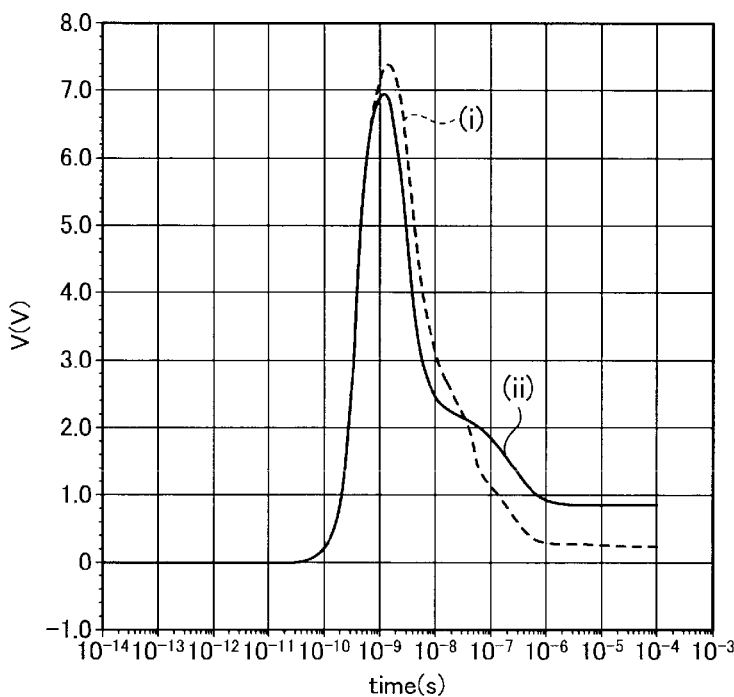
FIG. 4A and FIG. 4B are graphs showing a result of simulation of the electrostatic protection circuit according to the third embodiment.
Figure 4B:
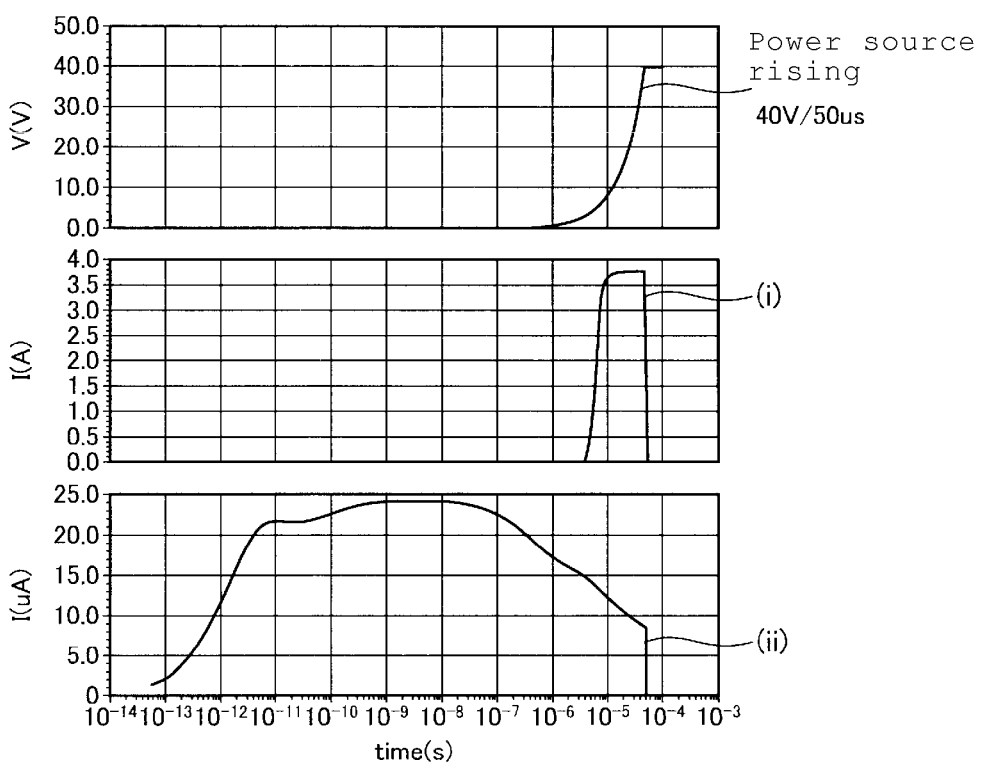

FIG. 4A and FIG. 4B are graphs showing a result of simulation of the electrostatic protection circuit according to the third embodiment depicted in FIG. 3.

FIG. 4A shows a result of simulation of a power source voltage when an ESD surge pulse (HBM: Human Body Model, C=100 picofarad (pF), R=1500 ohm (Ω)) is applied. A dotted line (i) in FIG. 4A indicates the result of simulation when the ESD surge pulse is applied to a protection circuit which lacks the control circuit 6 depicted FIG. 3. A solid line (ii) in FIG. 4A indicates the result of simulation when the ESD surge pulse is applied to embodiment depicted in FIG. 3, that is, a protection circuit which includes the control circuit 6.

As depicted, there is no substantial change or difference between the result of simulation indicated by the dotted line (i) and the result of simulation indicated by the solid line (ii). In both simulations, a power source voltage is suddenly increased due to the ESD surge pulse, and the power source voltage is lowered due to a discharge of the ESD surge by the NMOS shunt transistor 51.

FIG. 4B depicts results of simulations of startup processes when a voltage rising at a rate of 40 volts (V/50 micro seconds (μs)) is applied to an example which excludes the control circuit 6 from the embodiment depicted in FIG. 3 and sets a time constant of the trigger circuit 3 to 1 micro second (μs) (hereinafter referred to as "constitution 1") and the constitution which includes the control circuit 6 and has set a time constant of the trigger circuit 3 to 10 nanoseconds (ns) (hereinafter referred to as "constitution 2").

A power source voltage to be applied is shown in an upper portion (top graph "Power source rising") in FIG. 4B. The result of simulation when this voltage is applied to the constitution 1 is indicated by a solid line (i) at a middle portion (middle graph with y-axis labeled "I(A)") of FIG. 4B. When the depicted voltage is applied to the constitution 1, a transient electric current which exceeds 3.5 amperes (A) flows in the constitution 1. That is, the result shows that the electrostatic protection circuit responds to a power source voltage at the time of supplying electricity (startup) and a large inrush current flows into the constitution 1.

On the other hand, a solid line (ii) at a lower portion (bottom graph with y-axis labeled "I(μA)") of FIG. 4B shows the result of simulation when the depicted voltage is applied to the constitution 2. In the constitution 2, a time constant is small and hence, the protection operation by the electrostatic protection circuit rises quickly and hence, and an electric current which transiently flows is suppressed to an approximately 23 micro amperes (μA). It is assumed that the NMOS shunt transistor 51 functions properly even when a time constant of the trigger circuit 3 is shortened.

(Fourth Embodiment)

Figure 5:
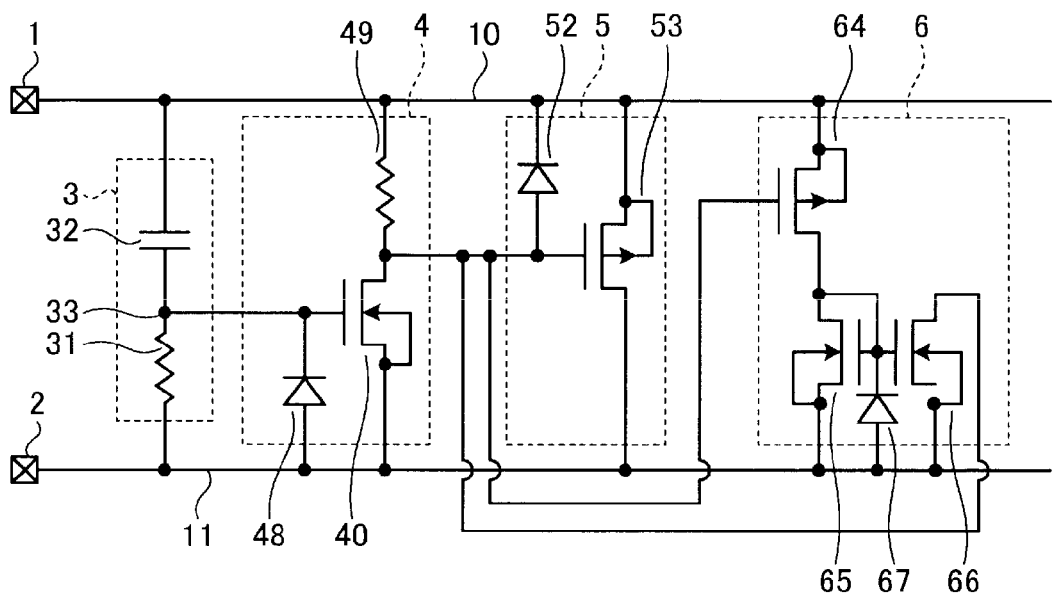
FIG. 5 is a diagram of an electrostatic protection circuit according to a fourth embodiment.

FIG. 5 is a diagram depicting an electrostatic protection circuit according to the fourth embodiment. Elements of the fourth embodiment which correspond to the elements of the previously explained embodiments are given same reference symbols, and the repeated explanation of these elements may be omitted.

This fourth embodiment differs from the third embodiment with respect to the connection relationship between a resistor 31 and a capacitor 32 of a trigger circuit 3. That is, the capacitor 32 is connected to a first power source line 10 at a high potential side, and the resistor 31 is connected to a second power source line 11 at a low potential side.

A buffer circuit 4 includes an NMOS transistor 40, a gate protection diode 48 and a resistor 49. A gate electrode of the NMOS transistor 40 is connected to a common connection node 33 of the trigger circuit 3. A source electrode and a back gate electrode of the NMOS transistor 40 are connected to the second power source line 11, and a drain electrode of the NMOS transistor 40 is connected to one end of the resistor 49. The other end of the resistor 49 is connected to the first power source line 10. The gate protection diode 48 is connected between the gate and a source of the NMOS transistor 40.

A switch circuit 5 includes a PMOS transistor 53 for discharge (hereinafter referred to as "PMOS shunt transistor") and a gate protection diode 52. A gate electrode of the PMOS shunt transistor 53 is connected to the drain electrode of the NMOS transistor 40. A source electrode and a back gate electrode of the PMOS shunt transistor 53 are connected to the first power source line 10, and a drain electrode of the PMOS shunt transistor 53 is connected to the second power source line 11. A source-drain path which forms a main current path of the PMOS shunt transistor 53 is connected between the first power source line 10 and the second power source line 11. The gate protection diode 52 is connected between the gate electrode and the source electrode of the PMOS shunt transistor 53.

A control circuit 6 includes a PMOS transistor 64, an NMOS transistor 65, an NMOS transistor 66 and a gate protection diode 67.

A gate electrode of the PMOS transistor 64 is connected to the gate electrode of the PMOS shunt transistor 53. A source electrode and a back gate electrode of the PMOS transistor 64 are connected to the first power source line 10, and a drain electrode of the PMOS transistor 64 is connected to a drain electrode and a gate electrode of the NMOS transistor 65.

A source electrode and a back gate electrode of the NMOS transistor 65 are connected to the second power source line 11.

A gate electrode of the NMOS transistor 66 is connected to the gate electrode of the NMOS transistor 65, and a source electrode and a back gate electrode of the NMOS transistor 66 are connected to the second power source line 11. The NMOS transistor 65 and the NMOS transistor 66 form a current mirror circuit.

A gate protection diode 67 is connected between the gate electrodes of the NMOS transistor 65 and the NMOS transistor 66 and the second power source line 11.

A drain electrode of the NMOS transistor 66, which constitutes an output end of the control circuit 6, is connected to the gate electrode of the PMOS shunt transistor 53.

When an ESD surge which is positive potential with respect to a second power source terminal 2 is applied to a first power source terminal 1, a transient electric current flows in the trigger circuit 3. When a voltage drop across the resistor 31 exceeds a threshold value of the NMOS transistor 40, the NMOS transistor 40 is turned on. When the NMOS transistor 40 is turned on, a signal of a low level is supplied to the gate electrode of the PMOS shunt transistor 53 so that the PMOS shunt transistor 53 is turned on. When the PMOS shunt transistor 53 is turned on, the ESD surge can be discharged.

In this fourth embodiment, the PMOS shunt transistor 53 is turned on in response to a signal of a low level and hence, the control circuit 6 is configured to supply a signal of a low level to the gate electrode of the PMOS shunt transistor 53 in response to a drive signal from the buffer circuit 4. The signal is supplied so as to maintain an ON state of the PMOS shunt transistor 53. A signal of a low level which is applied to the gate electrode of the PMOS shunt transistor 53 is also applied to the gate electrode of the PMOS transistor 64 of the control circuit 6. Accordingly, the PMOS transistor 64 is turned on. When the PMOS transistor 64 is turned on, a signal of a high level is supplied to the gate electrodes of the NMOS transistor 65 and the NMOS transistor 66, which constitute a current mirror circuit. Accordingly, the NMOS transistor 65 and the NMOS transistor 66 are turned on. When the NMOS transistor 66 is turned on, a potential of the second power source line 11, that is, signal of a low level is applied to the gate electrode of the PMOS shunt transistor 53 via the NMOS transistor 66.

A positive feedback loop is formed in the control circuit 6. That is, the positive feedback loop is formed where when a signal of a low level is applied to the gate electrode of the PMOS transistor 64, the PMOS transistor 64, the NMOS transistor 65, and the NMOS transistor 66 are turned on, and a potential of the second power source line 11, that is, a signal of a low level is supplied to the gate electrode of the PMOS transistor 64.

This positive feedback loop is formed in response to the drive signal from the buffer circuit 4. Once the positive feedback loop is formed, the positive feedback loop is maintained while the PMOS transistor 64 is in an ON state, that is, during a period where a potential supplied from the drain electrode of the NMOS transistor 66 can maintain the PMOS transistor 64 in an ON state.

Accordingly, regardless of the output from the buffer circuit 4, a signal of a low level from the control circuit 6 is supplied to the gate electrode of the PMOS shunt transistor 53. That is, the supply of a signal to the gate electrode of the PMOS shunt transistor 53 from the control circuit 6 is continued until the ESD surge is discharged by the PMOS shunt transistor 53 such that a voltage of the first power source line 10 is lowered whereby the PMOS transistor 64 is turned off. Accordingly, even when a time constant of the trigger circuit 3 is shortened, it is possible to maintain the PMOS shunt transistor 53 in an ON state until the discharge of the ESD surge is completed. By shortening a time constant of the trigger circuit 3, it is possible to provide an electrostatic protection circuit where an erroneous operation rarely occurs at startup or due to the fluctuation of a power source voltage or the like during normal operations.

In this fourth embodiment, the gate protection diode 48 is connected between the gate and the source of the NMOS transistor 40, which constitutes the buffer circuit 4, the gate protection diode 52 is connected between the gate and the source of the PMOS shunt transistor 53, which constitutes the switch circuit 5, and the gate protection diode 67 is connected between the gates and the sources of the NMOS transistor 65 and the NMOS transistor 66, which constitute a current mirror circuit in the control circuit 6.

Accordingly, even when a high voltage is applied between the first power source line 10 and the second power source line 11, a voltage of the NMOS transistor 40, a voltage of the PMOS shunt transistor 53, and a voltage between the gates and the sources of the NMOS transistor 65 and the NMOS transistor 66 are limited by the gate protection diode 48, the gate protection diode 52, and the gate protection diode 67, respectively. Thus, breakage of gate oxide films of the NMOS transistor 40, the PMOS transistor 53, the NMOS transistor 65 and the NMOS transistor 66 can be prevented.

(Fifth Embodiment)

Figure 6:
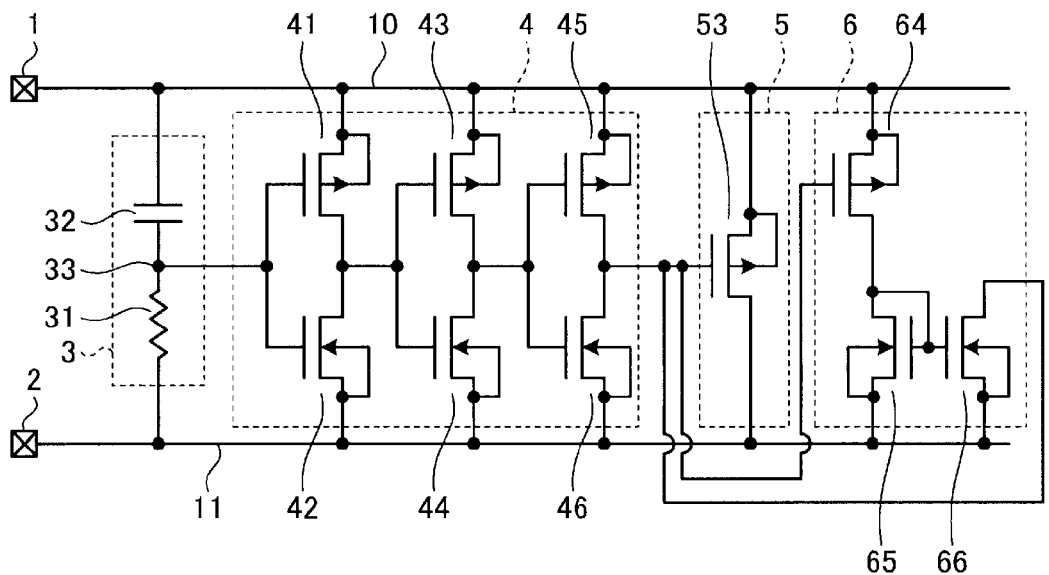
FIG. 6 is a diagram of an electrostatic protection circuit according to a fifth embodiment.

FIG. 6 is a diagram of an electrostatic protection circuit according to the fifth embodiment. Elements of the fifth embodiment which correspond to the elements of the previously explained embodiments are given same reference symbols, and the repeated explanation of these elements may be omitted.

This fifth embodiment is a modification of the second embodiment, and this fifth embodiment differs from the second embodiment with respect to the connection relationship between a resistor 31 and a capacitor 32, which constitute a trigger circuit 3. That is, in a similar manner as the previously explained with respect to the fourth embodiment, the capacitor 32 is connected to a first power source line 10 at a high potential side, and the resistor 31 is connected to a second power source line 11 at a low potential side.

A buffer circuit 4 includes CMOS inverters in three stages. That is, a PMOS transistor 41 and an NMOS transistor 42 constitute the first CMOS inverter, a PMOS transistor 43 and an NMOS transistor 44 constitute the second CMOS inverter, and a PMOS transistor 45 and an NMOS transistor 46 constitute the third CMOS inverter. By arranging the CMOS inverters as the buffer circuit 4 in multiple stages, a MOS transistor having a large current capacity can be used as the PMOS shunt transistor 53. With the use of a MOS transistor having a large current capacity as the PMOS shunt transistor 53, the ability to discharge an ESD surge can be enhanced.

The manner of operation of the electrostatic protection circuit of this embodiment is similar to the manner of operation of the electrostatic protection circuit of the previously explained second and fourth embodiments and hence, a detailed explanation of the manner of operation is omitted.

Also in this fifth embodiment, even when a time constant of the trigger circuit 3 is shortened, it is possible to maintain the PMOS shunt transistor 53 in an ON state until the ESD surge is sufficiently discharged. By shortening the time constant of the trigger circuit 3, it is possible to provide the electrostatic protection circuit where an erroneous operation rarely occurs at startup or due to the fluctuation of a power source voltage or the like during normal operations.

(Sixth Embodiment)

Figure 7:
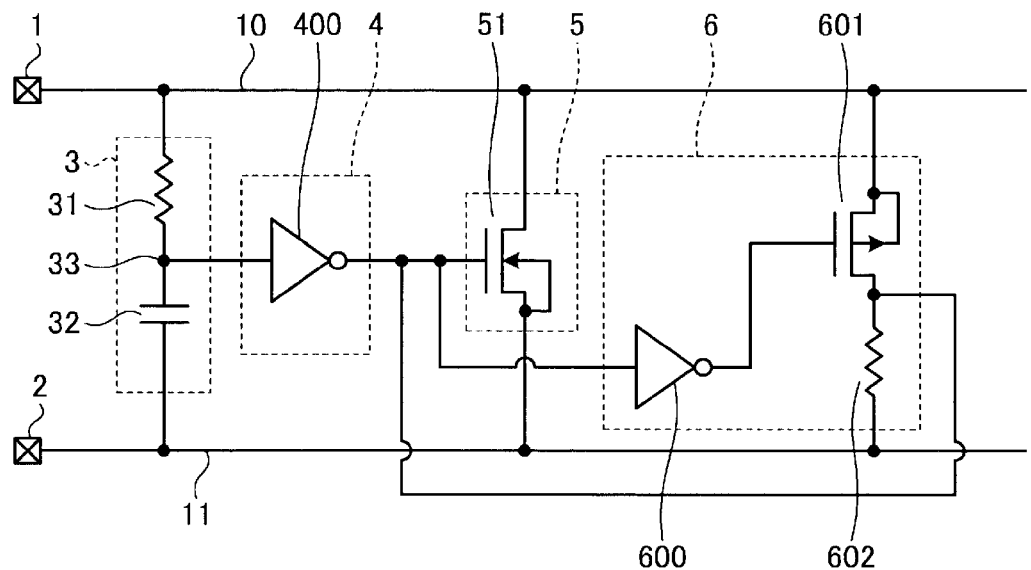
FIG. 7 is a diagram of an electrostatic protection circuit according to a sixth embodiment.

FIG. 7 is a diagram of an electrostatic protection circuit according to the sixth embodiment. Elements of the sixth embodiment which correspond to the elements of the previously explained embodiments are given same reference symbols, and the repeated explanation of these elements may be omitted.

In this sixth embodiment, a buffer circuit 4 includes an inverter 400. An output of the inverter 400 is supplied to a gate electrode of an NMOS shunt transistor 51, which constitutes a switch circuit 5.

In this sixth embodiment, a control circuit 6 includes an inverter 600 to which an output of the buffer circuit 4 is supplied. An output of the inverter 600 is supplied to a gate electrode of a PMOS transistor 601. A source electrode and a back gate electrode of the PMOS transistor 601 are connected to a first power source line 10. A drain electrode of the PMOS transistor 601 is connected to one end of a resistor 602. The other end of the resistor 602 is connected to a second power source line 11. The drain electrode of the PMOS transistor 601 is connected to the gate electrode of the NMOS shunt transistor 51.

When an ESD surge, which is positive with respect to a second power source terminal 2, is applied to a first power source terminal 1, a transient electric current flows in a trigger circuit 3. When a voltage drop across a resistor 31 exceeds a threshold value of the inverter 400, which constitutes the buffer circuit 4, a signal of a high level is outputted from the buffer circuit 4. When the signal of a high level is applied to the gate electrode of the NMOS shunt transistor 51, the NMOS shunt transistor 51 is turned on. When the NMOS shunt transistor 51 is turned on, the ESD surge is discharged.

When a signal of a high level is supplied to the inverter 600, a signal of a low level is supplied to the gate electrode of the PMOS transistor 601. When the signal of a low level is supplied to the gate electrode of the PMOS transistor 601, the PMOS transistor 601 is turned on. When the PMOS transistor 601 is turned on, the first power source line 10 and the gate electrode of the NMOS shunt transistor 51 are electrically connected to each other so that a potential of the first power source line 10, that is, a signal of a high level is supplied to the gate electrode of the NMOS shunt transistor 51.

In this embodiment, the NMOS shunt transistor 51, which constitutes the switch circuit 5, is turned on in response to a signal of a high level and hence, the control circuit 6 is configured to supply a signal of a high level to the gate electrode of the NMOS shunt transistor 51 in response to a drive signal from the buffer circuit 4. Due to a positive feedback loop, which is formed of the inverter 600 and the PMOS transistor 601 and starts from an input end of the inverter 600 and returns to the input end of the inverter 600 via the drain electrode of the PMOS transistor 601, even after a drive signal from the buffer circuit 4 is reduced to a low level, a signal of a high level is supplied to the gate electrode of the NMOS shunt transistor 51 from the control circuit 6. Accordingly, an ON state of the NMOS shunt transistor 51 can be maintained until the ESD surge is sufficiently discharged.

The positive feedback loop which is formed of the inverter 600 and the PMOS transistor 601 is formed in response to a drive signal from the buffer circuit 4. Once the positive feedback loop is formed, the positive feedback loop is maintained during a period where the PMOS transistor 601 is in an ON state. Accordingly, regardless of an output from the buffer circuit 4, a signal of a high level from the control circuit 6 is supplied to the gate electrode of the NMOS shunt transistor 51. The supply of a signal to the gate electrode of the NMOS shunt transistor 51 from the control circuit 6 is continued until the ESD surge is discharged by the NMOS shunt transistor 51 so that a voltage of the first power source line 10 is lowered whereby the PMOS transistor 601 is turned off.

Accordingly, even when a time constant of the trigger circuit 3 is shortened, it is possible to maintain the NMOS shunt transistor 51 in an ON state until the ESD surge is sufficiently discharged. By shortening the time constant of the trigger circuit 3, it is possible to provide the electrostatic protection circuit where an erroneous operation rarely occurs at startup or due the fluctuation of a power source voltage or the like during normal operations.

(Seventh Embodiment)

Figure 8:
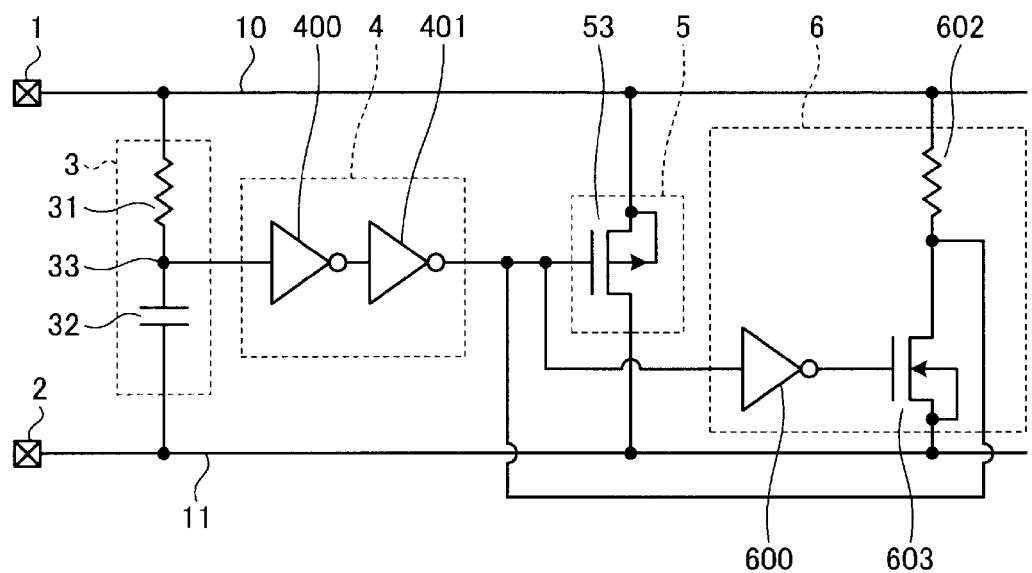
FIG. 8 is a diagram of an electrostatic protection circuit according to a seventh embodiment.

FIG. 8 is a diagram of an electrostatic protection circuit according to the seventh embodiment. Elements of the seventh embodiment which correspond to the elements of the previously explained embodiments are given same reference symbols, and the repeated explanation of these elements may be omitted. This seventh embodiment is a modification of the sixth embodiment, and this seventh embodiment differs from the sixth embodiment with respect to the number of inverters in a buffer circuit 4. The buffer circuit 4 of the seventh embodiment includes an inverter 400 and an inverter 401. An output of the inverter 401 is supplied to a gate electrode of a PMOS shunt transistor 53, which constitutes a switch circuit 5.

In this seventh embodiment, a control circuit 6 includes an inverter 600 to which an output of the buffer circuit 4 is supplied and an NMOS transistor 603. An output of the inverter 600 is supplied to a gate electrode of the NMOS transistor 603. A source electrode and a back gate electrode of the NMOS transistor 603 are connected to a second power source line 11. A drain electrode of the NMOS transistor 603 is connected to one end of a resistor 602. The other end of the resistor 602 is connected to a first power source line 10. A drain electrode of the NMOS transistor 603 is connected to a gate electrode of the PMOS shunt transistor 53.

When an ESD surge, which is positive in potential with respect to a second power source terminal 2, is applied to a first power source terminal 1, a transient electric current flows in a trigger circuit 3. When a voltage drop in a resistor 31 exceeds a threshold value of the inverter 400, a signal of a high level is supplied to the inverter 401 from the inverter 400, and a signal of a low level is supplied to the gate electrode of the PMOS shunt transistor 53 from the buffer circuit 4. When the signal of a low level is applied to the gate electrode of the PMOS shunt transistor 53, the PMOS shunt transistor 53 is turned on. When the PMOS shunt transistor 53 is turned on, the ESD surge is discharged.

When a signal of a low level is supplied to the inverter 600, a signal of a high level is supplied to the gate electrode of the NMOS transistor 603. When the signal of a high level is supplied to the gate electrode of the NMOS transistor 603, the NMOS transistor 603 is turned on. When the NMOS transistor 603 is turned on, the second power source line 11 and the gate electrode of the PMOS shunt transistor 53 are electrically connected to each other so that a signal of a low level is supplied to the gate electrode of the PMOS shunt transistor 53.

In this seventh embodiment, the PMOS shunt transistor 53, which constitutes the switch circuit 5, is turned on in response to a signal of a low level and hence, the control circuit 6 is configured to supply a signal of a low level to the gate electrode of the PMOS shunt transistor 53 in response to a drive signal from the buffer circuit 4. Due to a positive feedback loop which starts from an input end of the inverter 600 and returns to the input end of the inverter 600 via a drain electrode of the NMOS transistor 603, even when a drive signal from the buffer circuit 4 is elevated to a high level, a signal of a low level is supplied to the gate electrode of the PMOS shunt transistor 53 from the control circuit 6. Due to such a configuration, an ON state of the PMOS shunt transistor 53 can be maintained.

The positive feedback loop which is formed of the inverter 600 and the NMOS transistor 603 is formed in response to a drive signal from the buffer circuit 4. Once the positive feedback loop is formed, the positive feedback loop is maintained during a period where the NMOS transistor 603 is in an ON state. Accordingly, regardless of an output from the buffer circuit 4, a signal of a low level is supplied to the gate electrode of the PMOS shunt transistor 53 from the control circuit 6. The supply of a signal to the gate electrode of the PMOS shunt transistor 53 from the control circuit 6 is continued until the ESD surge is discharged by the PMOS shunt transistor 53 so that a voltage of the first power source line 10 is lowered whereby the NMOS transistor 603 is turned off.

Accordingly, even when a time constant of the trigger circuit 3 is shortened, it is possible to maintain the PMOS shunt transistor 53 in an ON state until the ESD surge is sufficiently discharged. By shortening the time constant of the trigger circuit 3, it is possible to provide the electrostatic protection circuit where an erroneous operation rarely occurs at startup or due to fluctuation of a power source voltage or the like during normal operations.

While various example embodiment have depicted the switch circuit 5 as comprising metal-oxide-semiconductor devices, it is also contemplated that the switch circuit 5 may be formed using a bipolar transistor. When the bipolar transistor is used, a main current path is formed of an emitter-collector path and a control electrode is formed of a base electrode. In such embodiments, an NPN transistor may be used in place of the NMOS transistor in view of the bias relationship.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrostatic protection circuit, comprising:
   a trigger circuit connected between a first power source line and a second power source line and configured to output a trigger signal in response to a voltage difference between the first and second power source lines;
   a buffer circuit configured to output a drive signal in response to the trigger signal;

a switch circuit having a main current path connected between the first power source line and the second power source line, and configured to switch a conduction state of the main current path between an ON state and an OFF state in accordance with the drive signal, the switch circuit including a first transistor having a source-drain path connected between the first power source line and the second power source line; and a control circuit configured to supply a control signal to the switch circuit in response to the drive signal to cause the switch circuit to switch the conduction state of the main current path to the ON state, the control signal maintaining the conduction state of the main current path in the ON state while the voltage difference between the first and second power source lines exceeds a predetermined value, the control circuit including:
   a second transistor having a source electrode, a drain electrode, and a gate electrode; and
   a current mirror circuit connected between the drain electrode of the second transistor and one of the first and second power source lines, wherein
the drive signal is supplied to a gate electrode of the first transistor and the gate electrode of the second transistor, and
an output of the current mirror circuit is supplied to the gate electrode of the first transistor.

2. The electrostatic protection circuit according to claim 1, wherein
   the trigger circuit includes a resistor and a capacitor connected in series between the first power source line and the second power source line.

3. The electrostatic protection circuit according to claim 2, wherein the control circuit electrically connects the first power source line and a control terminal of the switch circuit to each other when the drive signal is a high level, and the control circuit electrically connects the second power source line and the control terminal of the switch circuit to each other when the drive signal is a low level.

4. The electrostatic protection circuit according to claim 1, wherein the control circuit electrically connects the first power source line and a control terminal of the switch circuit to each other when the drive signal is a high level, and the control circuit electrically connects the second power source line and the control terminal of the switch circuit to each other when the drive signal is a low level.

5. The electrostatic protection circuit according to claim 1, wherein the buffer circuit comprises a plurality of inverters.

6. The electrostatic protection circuit according to claim 5, wherein the inverters are CMOS (complementary metal-oxide-semiconductor) inverters.

7. The electrostatic protection circuit according to claim 1, wherein the first transistor is a n-channel metal-oxide-semiconductor transistor.

8. The electrostatic protection circuit according to claim 1, wherein the first transistor is a p-channel metal-oxide-semiconductor transistor.

9. The electrostatic protection circuit according to claim 1, wherein the first transistor is a bipolar transistor.

10. An electrostatic protection circuit, comprising:
a trigger circuit connected between a first power source line and a second power source line and configured to output a trigger signal in response to a voltage difference between the first and second power source lines;
a buffer circuit configured to output a drive signal in response to the trigger signal;
a switch circuit having a main current path connected between the first power source line and the second power source line, and configured to switch a conduction state of the main current path between an ON state and an OFF state in accordance with the drive signal; and
a control circuit configured to supply a control signal to the switch circuit in response to the drive signal to cause the switch circuit to switch the conduction state of the main current path to the ON state, the control signal maintaining the conduction state of the main current path in the ON state while the voltage difference between the first and second power source lines exceeds a predetermined value, wherein
the buffer circuit comprises a transistor and a resistor connected in series between the first and second power source lines, and the trigger signal is supplied to a gate electrode of the transistor and the drive signal is supplied from a connection node between the transistor and the resistor.

11. The electrostatic protection circuit of claim 10, wherein the buffer circuit further comprises a gate protection diode connected between the gate electrode of the transistor and one of the first and second power source lines.

12. An electrostatic protection circuit, comprising:
a trigger circuit connected between a first power source line and a second power source line and configured to output a trigger signal in response to a voltage difference between the first and second power source lines;
a buffer circuit configured to output a drive signal in response to the trigger signal;
a switch circuit having a main current path connected between the first power source line and the second power source line, and configured to switch a conduction state of the main current path between an ON state and an OFF state in accordance with the drive signal; and
a control circuit configured to supply a control signal to the switch circuit in response to the drive signal to cause the switch circuit to switch the conduction state of the main current path to the ON state, the control signal maintaining the conduction state of the main current path in the ON state while the voltage difference between the first and second power source lines exceeds a predetermined value, wherein
the switch circuit is a p-channel metal-oxide-semiconductor (PMOS) transistor,
the control circuit comprises an inverter circuit configured to receive the drive signal and output an inverted drive signal to a gate electrode of a n-channel metal-oxide-semiconductor (NMOS) transistor that has a source electrode and a back-gate electrode connected to the second power source line,
a drain electrode of the NMOS transistor is connected to a resistor and a gate electrode of the PMOS transistor, and
the resistor is connected between the first power source line and the drain electrode of the NMOS transistor.

13. An electrostatic protection circuit, comprising:
a trigger circuit connected between a first power source line and a second power source line and configured to output a trigger signal in response to a voltage difference between the first and second power source lines;
a buffer circuit configured to output a drive signal in response to the trigger signal;
a switch circuit having a main current path connected between the first power source line and the second power source line, and configured to switch a conduction state of the main current path between an ON state and an OFF state in accordance with the drive signal; and a control circuit configured to supply a control signal to the switch circuit in response to the drive signal to cause the switch circuit to switch the conduction state of the main current path to the ON state, the control signal maintaining the conduction state of the main current path in the ON state while the voltage difference between the first and second power source lines exceeds a predetermined value, wherein the switch circuit is an n-channel metal-oxide-semiconductor (NMOS) transistor, the control circuit comprises an inverter circuit configured to receive the drive signal and output an inverted drive signal to a gate electrode of a p-channel metal-oxide-semiconductor (PMOS) transistor that has a source electrode and a back-gate electrode connected to the first power source line, a drain electrode of the PMOS transistor is connected to a resistor and a gate electrode of the NMOS transistor, and the resistor is connected between the second power source line and the drain electrode of the PMOS transistor.

14. An electrostatic protection circuit, comprising:

a first power source line to which a first power source voltage is to be applied;

a second power source line to which a second power source voltage is to be applied;

a trigger circuit including a resistor and a capacitor connected in series between the first and second power source lines and configured to output a trigger signal in accordance with a voltage difference between the first and second power source lines;

a buffer circuit including an input terminal connected to a connection node between the resistor and capacitor and configured to output a drive signal from an output terminal in response to the trigger signal;

a switch circuit including a switch terminal connected to the output terminal of the buffer circuit and configured to switch an electrical connection between the first and second power source lines between an ON state and OFF state in response to a signal supplied to the switch terminal; and a control circuit connected to the switch terminal and configured to supply a control signal to the switch circuit in response to the drive signal, wherein when the trigger signal indicates a voltage difference between the first and second power source lines exceeds a first predetermined value, the drive signal from the buffer circuit causes the switch circuit to switch the electrical connection to the ON state and also causes the control circuit to supply the control signal to the switch terminal, and the control circuit is configured supply the control signal to maintain the electrical connection in the ON state while the voltage difference between the first and second power source lines exceeds a second predetermined value.

15. The electrostatic protection circuit according to claim 14, wherein the first and second predetermined values are the same.

16. The electrostatic protection circuit according to claim 14, wherein the control circuit includes a current mirror circuit.

* * * * *